United States Patent
Kobe et al.

(10) Patent No.: US 10,167,761 B2
(45) Date of Patent: Jan. 1, 2019

(54) INJECTION DEVICE AND CORRESPONDING METHOD FOR MANUFACTURING SAME

(71) Applicant: Eberspächer Exhaust Technology GmbH & Co.KG, Neunkirchen (DE)

(72) Inventors: Jürgen Kobe, Nürtingen-Raidwangen (DE); Frank Berkemer, Eningen u.A. (DE); Konrad Klausa, Deizisau (DE); David Binder, Schramberg (DE); Felix Hackländer, Esslingen (DE)

(73) Assignee: Eberspächer Exhaust Technology GmbH & Co.KG, Neunkirchen (DE)

( * ) Notice: Subject to any disclaimer, the term of this patent is extended or adjusted under 35 U.S.C. 154(b) by 709 days.

(21) Appl. No.: 14/812,166

(22) Filed: Jul. 29, 2015

(65) Prior Publication Data
US 2016/0032808 A1 Feb. 4, 2016

(30) Foreign Application Priority Data
Jul. 31, 2014 (DE) .................. 10 2014 215 084

(51) Int. Cl.
*F01N 3/20* (2006.01)
*F01N 3/28* (2006.01)
(Continued)

(52) U.S. Cl.
CPC ......... *F01N 3/2066* (2013.01); *F01N 3/2892* (2013.01); *F01N 13/08* (2013.01);
(Continued)

(58) Field of Classification Search
CPC ...... F01N 3/2066; F01N 3/2892; F01N 13/08; F01N 13/1838; F01N 13/185;
(Continued)

(56) References Cited

U.S. PATENT DOCUMENTS 5,349,817 A    9/1994  Bekkering
6,279,603 B1 * 8/2001  Czarnik ............ B01D 53/8625
                                                  123/472
(Continued)

FOREIGN PATENT DOCUMENTS

DE    202004000200 U1   4/2004
DE    102005052064 A1   5/2007
(Continued)

*Primary Examiner* — Patrick Maines
(74) *Attorney, Agent, or Firm* — McGlew and Tuttle, P.C.

(57) ABSTRACT

An injection device (14), for introducing a reducing agent (11) into an exhaust gas stream (8) of an exhaust system (7) of an internal combustion engine (1), has an exhaust pipe (15) for guiding the exhaust gas stream (8), which has a connecting piece opening (18) in a wall (17). A connecting piece (16) is inserted with an inner end (19) into the connecting piece opening (18) and is provided for connecting an injector (10) at an outer end (20). Simplified assembly is achieved if the connecting piece (16) has, at an inner end (19), a laterally projecting, fully circumferentially extending collar (22). The collar (22) is in contact, on an inner side (23) of the wall (17), with an opening edge (24) enclosing the connecting piece opening (18) and is welded to the wall (17).

20 Claims, 2 Drawing Sheets

(51) Int. Cl.
*F01N 13/08* (2010.01)
*F01N 13/18* (2010.01)

(52) U.S. Cl.
CPC ....... *F01N 13/185* (2013.01); *F01N 13/1838* (2013.01); *F01N 13/1888* (2013.01); *F01N 2450/22* (2013.01); *F01N 2470/00* (2013.01); *F01N 2610/1453* (2013.01); *Y02T 10/24* (2013.01)

(58) Field of Classification Search
CPC ............. F01N 13/1888; F01N 2450/22; F01N 2470/00; F01N 2610/1453; Y02T 10/24
See application file for complete search history.

(56) References Cited

U.S. PATENT DOCUMENTS

| | | | | |
|---|---|---|---|---|
| 2003/0226412 | A1* | 12/2003 | Rumminger | F01N 13/008 73/866.5 |
| 2008/0236147 | A1* | 10/2008 | Van Vuuren | F01N 3/2066 60/295 |
| 2010/0212292 | A1* | 8/2010 | Rusch | F01N 3/2066 60/274 |
| 2010/0263359 | A1 | 10/2010 | Haverkamp et al. | |
| 2011/0094206 | A1* | 4/2011 | Liu | F01N 3/2066 60/274 |
| 2012/0174561 | A1* | 7/2012 | Troxler | F01N 3/2066 60/274 |
| 2015/0361853 | A1* | 12/2015 | Nagata | F01N 3/36 60/303 |

FOREIGN PATENT DOCUMENTS

| | | |
|---|---|---|
| DE | 20 2008 001547 U1 | 4/2008 |
| DE | 102006059507 A1 | 6/2008 |
| DE | 202007010324 U1 | 11/2008 |
| DE | 10 2007 048560 A1 | 4/2009 |
| DE | 10 2008 050 101 A1 | 4/2010 |
| DE | 10 2010 049018 A1 | 4/2012 |
| FR | 1 327 284 A | 5/1963 |
| KR | 1020140053705 A | 5/2014 |
| WO | 0104466 A1 | 1/2001 |
| WO | 2008034981 A1 | 3/2008 |

\* cited by examiner

INJECTION DEVICE AND CORRESPONDING METHOD FOR MANUFACTURING SAME

CROSS REFERENCE TO RELATED APPLICATIONS

This application claims the benefit of priority under 35 U.S.C. § 119 of German Patent Application DE 10 2014 215 084.1 filed Jul. 31, 2014, the entire contents of which are incorporated herein by reference.

FIELD OF THE INVENTION

The present invention pertains to an injection device for introducing a reducing agent into an exhaust gas stream of an exhaust system of an internal combustion engine. The present invention also pertains to a method for manufacturing such an injection device.

BACKGROUND OF THE INVENTION

The introduction of a reducing agent into an exhaust gas stream of an exhaust system is considered above all in so-called SCR systems, where SCR denotes Selective Catalytic Reduction. A liquid reducing agent, namely, preferably an aqueous urea solution, is usually considered for use as a reducing agent. The reducing agent evaporates in the exhaust gas stream and can react by thermolysis and subsequent hydrolysis to form ammonia and carbon dioxide. As a result, nitrogen oxides can be reduced into nitrogen and water in an SCR catalytic converter.

An injection device suitable for introducing the reducing agent into the exhaust gas stream usually comprises an exhaust pipe for guiding the exhaust gas stream, which has a connecting piece opening, as well as a connecting piece, which is connected with an inner end to the connecting piece opening and which is provided at an outer end for connecting an injector. The injector can then inject the reducing agent into the exhaust gas stream being led in the exhaust pipe through the connecting piece and through the connecting piece opening.

The tight connection of the connecting piece to the exhaust pipe is comparatively complicated, because the exhaust pipe usually has a round cross section. Further, the connecting piece is not preferably connected vertically or perpendicularly to an outer side of the wall of the exhaust pipe, but sloped in relation to the vertical direction. As a result, the geometric transition between the exhaust pipe usually provided with a round cross section and the connecting piece usually provided with a round cross section is comparatively complicated. The manufacture of such an injection device is comparatively complicated as a result. In particular, a relatively large flange is necessary at the inner end of the connecting piece in order to make it possible to weld this connecting piece on the outer side of the exhaust pipe. If, however, the connecting piece is manufactured integrally with the flange as a cast part, the connecting piece will have a relatively large thermal mass. As a result, the connecting piece can absorb a relatively large quantity of heat during the operation of the exhaust system and conduct this heat to its outer end and transmit it to the injector there. Since the injector is comparatively heat-sensitive, a large thermal mass of the connecting piece may lead to damage to or destruction of the injector.

As an alternative, it is conceivable, for example, to use a separate adapter, which has, on the one hand, the flange and is adapted to the geometry of the outer side of the exhaust pipe, and is adapted, on the other hand, to the geometry of the inner end of the connecting piece. The adapter can then be welded relatively easily to the connecting piece, on the one hand, and to the exhaust pipe, on the other hand. As a result, the connecting piece can be embodied with a markedly reduced wall thickness, which reduces the thermal mass of said connecting piece. However, this manufacturing operation is comparatively complicated because of the increased number of parts, because relatively many steps and components are necessary.

SUMMARY OF THE INVENTION

An object of the present invention is to provide an improved embodiment, which is characterized especially by reduced manufacturing costs, for an injection device of the above-described type and for a corresponding manufacturing method.

According to the invention, an injection device is provided for introducing a reducing agent into an exhaust gas stream of an exhaust system of an internal combustion engine. The injection device comprises an exhaust pipe for guiding the exhaust gas stream, the exhaust pipe having a wall with a connecting piece opening in the wall. A connecting piece is inserted with an inner end into the connecting piece opening. The connecting piece is provided at an outer end for connecting an injector. The connecting piece has, at a connecting piece inner end, a laterally projecting, fully circumferentially extending collar. The collar is in contact, on an inner side of the wall, with an opening edge enclosing the connecting piece opening. The collar is welded to the wall.

The present invention is based on the general idea of equipping the connecting piece at its inner end with a laterally projecting collar, which extends circumferentially fully in the circumferential direction of the connecting piece and which comes into contact with an inner side of the wall of the exhaust pipe in the area of an opening edge enclosing the connecting piece opening. Further, it is proposed that the connecting piece be welded to the exhaust pipe in the area of its collar. The fact that the collar is formed integrally on the connecting piece leads to a one-piece component that is uniform in terms of the material. The collar may be formed, for example, by plastic deformation on the connecting piece. It may likewise be a one-piece, integral cast part. Thus, ultimately only two components are necessary, namely, the connecting piece with the collar, and the exhaust pipe, which must be fitted together. The positioning of the collar on the inner side of the wall of the exhaust pipe is of decisive significance, because pressure loads, which develop in the interior of the exhaust pipe, are supported via the collar on the opening edge and hence as forces of pressure on the exhaust pipe. Thus, such forces of pressure do not load the welded connection between the collar and the exhaust pipe or do so only negligibly, so that a stable and tight connection can be created here in a durable manner between the connecting piece and the exhaust pipe. In addition, only a single welded connection is necessary between the connecting piece and the exhaust pipe due to the suggestion according to the present invention in order to fasten the connecting piece to the exhaust pipe. However, it is decisive that the collar, which represents a flange located on the inside, can be dimensioned as a relatively small collar, so that the thermal mass of the connecting piece with the collar is ultimately reduced to the extent that the risk of damage to the injector due to overheating during the operation of the exhaust system is reduced. On the whole, an injection device that can be manufactured at a low cost is thus presented. The method for manufacturing this injection device can likewise be carried out at a comparatively low cost.

The collar can be manufactured in an especially simple manner such that it is formed in terms of its geometry complementarily to the inner side of the wall in the area of the opening edge. In this way, a large-area supporting of the collar on the inner side of the wall can be achieved in an especially simple manner.

Corresponding to an advantageous embodiment, the collar may be welded to the wall by means of a weld seam that extends circumferentially as a closed seam on the collar, the weld seam being located on the inner side of the wall. In this way, the weld seam can be manufactured in an especially simple manner especially in case of collars formed complementarily to the inner side of the wall, in order to generate sufficient strength and sufficient tightness.

In another embodiment, the exhaust pipe may be assembled from a first shell and a second shell, wherein the two shells extend each from an inlet end of the exhaust pipe to an outlet end of the exhaust pipe. Only the first shell contains the connecting piece opening, and the connecting piece is welded only to the first shell. It is possible, in particular, due to the two-shell design of the exhaust pipe to mount the connecting piece on the first shell and to weld to it same when the exhaust pipe is not yet assembled. As long as the second shell is not mounted on the first shell, the exhaust pipe is open over its entire length, as a result of which its inner side is especially readily accessible for inserting the connecting piece into the connecting piece opening and to weld the collar to the wall of the exhaust pipe. Even though a plurality of individual parts are present due to the exhaust part comprising a plurality of parts, improved manufacturability is achieved, on the whole, because, for example, the connecting piece can be inserted through the connecting piece opening from the inside in a more simple manner.

In another embodiment, a static mixer may be inserted into the exhaust pipe in the area of an outlet end of the exhaust pipe. Such a static mixer is designed such that it supports, on the one hand, the evaporation of the reducing agent, which is optionally introduced in the liquid form, and improves, on the other hand, the mixing of the reducing agent with the exhaust gas stream. Such a static mixer represents a separate component, which is inserted into the exhaust pipe. Such a static mixer may preferably have a plurality of guide blades, which are arranged in a star-shaped pattern and which have especially a pitch in the same direction in relation to the exhaust gas stream, and as a result of which the exhaust gas stream will be imparted a twist while it is flowing through the mixer. The guide blades may be arranged geometrically such that the cross section of the exhaust pipe, through which the flow takes place, is opaque in the axial direction, i.e., in the principal direction of flow. Liquid droplets being entrained in the exhaust gas stream thus inevitably reach the guide blades. Since these are heated by the exhaust gas stream, the guide blades bring about evaporation of the liquid reducing agent impacting on same.

The integration of such a mixer within the injection device simplifies the subsequent mounting of the injection device in the exhaust system. For example, the injection device is installed in the exhaust system directly upstream of an SCR catalytic converter, so that the outlet end of the exhaust pipe is connected directly with an inlet end of the SCR catalytic converter.

According to a variant, the mixer can be installed especially advantageously in the two-shell exhaust pipe. Provisions may be made for this for the two shells to be fastened to one another along two mutually opposite connection areas, the two connection areas extending each from the inlet end of the exhaust pipe to the outlet end of the exhaust pipe.

Further, the mixer may have on its outer side two meshing areas, which mesh each with one of the connection areas, preferably such that the mixer is fastened to the exhaust pipe by the fastening of the two shells to one another.

Provisions may preferably be made for the two shells to be fastened to one another along the respective connection area by means of a continuous weld seam, into which the respective meshing area is integrated. Due to this integration of the respective meshing area within the weld seam of the corresponding connection area, the respective meshing area is ultimately fastened and hence welded to at least one of the two shells, preferably to two shells, by means of the weld seam.

In another embodiment, the connecting piece may be arranged on the exhaust pipe such that a central longitudinal axis of the connecting piece is inclined in relation to a vertical direction extending radially to the central longitudinal axis of the exhaust pipe in the area of the connecting piece opening. For example, a slope angle of 30° to 60° is conceivable. The inner end of the connecting piece and the collar can be readily adapted geometrically to the respective desired slope angle, which simplifies the mounting of the connecting piece on the exhaust pipe.

In another embodiment, the exhaust pipe may have at least one arc, and the connecting piece opening is arranged axially aligned with an outlet end of the exhaust pipe in this case. Further, the connecting piece may be optionally straight and aligned coaxially with the outlet end of the exhaust pipe. The provision of such an arc in the exhaust pipe makes it possible, especially in connection with a sloped arrangement of the connecting piece on the exhaust pipe, to generate injection of the reducing agent that is oriented concentrically to the central longitudinal axis of the exhaust pipe. For example, an injection direction of the injector may be aligned such that it extends coaxially to the central longitudinal axis of the connecting piece and is correspondingly also aligned coaxially with the outlet end of the exhaust pipe. It is achieved in this manner that the injected reducing agent travels over the longest possible path before it impacts on the wall of the exhaust pipe or the mixer.

In another advantageous embodiment, the exhaust pipe may have a first arc (first arcuate portion), and the connecting piece opening is arranged now axially aligned, especially coaxially aligned, with an outlet end of the exhaust pipe. Further, the exhaust pipe may have a second arc (second arcuate portion) upstream, of the first arc, and the connecting piece opening is arranged on a straight pipe section formed between the first arc and the second arc. The fact that the connecting piece is arranged on a straight pipe section simplifies the mounting of the connecting piece. The provision of two arcs in the exhaust pipe simplifies, by contrast, the mounting of the injection device in the exhaust system.

The first arc and the second arc may preferably be located in a common central longitudinal plane of the exhaust pipe. A two-fold, two-dimensional deflection of the exhaust gas stream is thus essentially achieved, but no three-dimensional deflection.

The first arc and the second arc may preferably have opposite curvatures. It is achieved hereby that an inlet end of the exhaust pipe and an outlet end of the exhaust pipe have only a comparatively small offset, which simplifies the integration of the injection device in the exhaust system.

Corresponding to another variant, the first arc and the second arc may have essentially equal curvatures in terms of value. As a consequence, the direction of flow of the exhaust gas stream at the inlet end is largely parallel to the direction of flow of the exhaust gas stream in the outlet end. This measure also leads to a simplified integration of the injection device in the exhaust system.

The method according to the present invention for manufacturing such an injection device is characterized in that the connecting piece is passed through the connecting piece opening from an inner side of the wall up to a laterally projecting, fully circumferential collar, formed at the inner end of the connecting piece, on the inner side of the wall at an opening edge enclosing the connecting piece opening. Further, the collar is subsequently welded to the wall. It is achieved through this mode of construction that pressure loads of the connection between the connecting piece and the exhaust pipe are transmitted in a positive-locking manner between the collar and the opening edge without the welded connection between the connecting piece and the exhaust pipe being critically loaded thereby.

Corresponding to an advantageous embodiment, the collar may be welded to the wall on the inner side of the wall. This means that the welded connection is prepared from the inside, i.e., from the interior of the exhaust pipe. The establishment of a sufficiently tight connection between the collar and the wall can be simplified hereby. In particular, the connecting piece does not cause any disturbance in case of this procedure when preparing the welded connection.

According to another variant, the collar may be welded to the wall by means of a weld seam extending fully circumferentially on the collar. Such a circumferentially extending weld seam brings about the necessary tightness between the connecting piece and the exhaust pipe.

According to another embodiment, in which the exhaust pipe has a first shell having the connecting piece opening and a second shell, the method can be carried out such that the connecting piece is inserted into the connecting piece opening before placing the second shell on the first shell and is welded to the first shell. The second shell can then be attached to the first shell after welding the connecting piece to the first shell. For example, the second shell is also welded to the first shell, and corresponding weld seams are preferably prepared on an outer side of the exhaust pipe. With the second shell missing, the mounting of the connecting piece is simplified, because the inner side of the exhaust pipe is especially readily accessible as a result.

Corresponding to a variant, a static mixer may be inserted into the first shell or into the second shell in the area of an outlet end of the exhaust pipe prior to the second shell being placed on the first shell. To simplify the fixation of the mixer on the exhaust pipe, the mixer may have two radially projecting meshing sections, which mesh with the connection between the first shell and the second shell, so that the mixer is also fixed on the exhaust pipe due to the fixation of the first shell on the second shell.

It is apparent that the above-mentioned features, which will also be explained below, may be applied not only in the particular combination indicated but in other combinations or alone as well, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
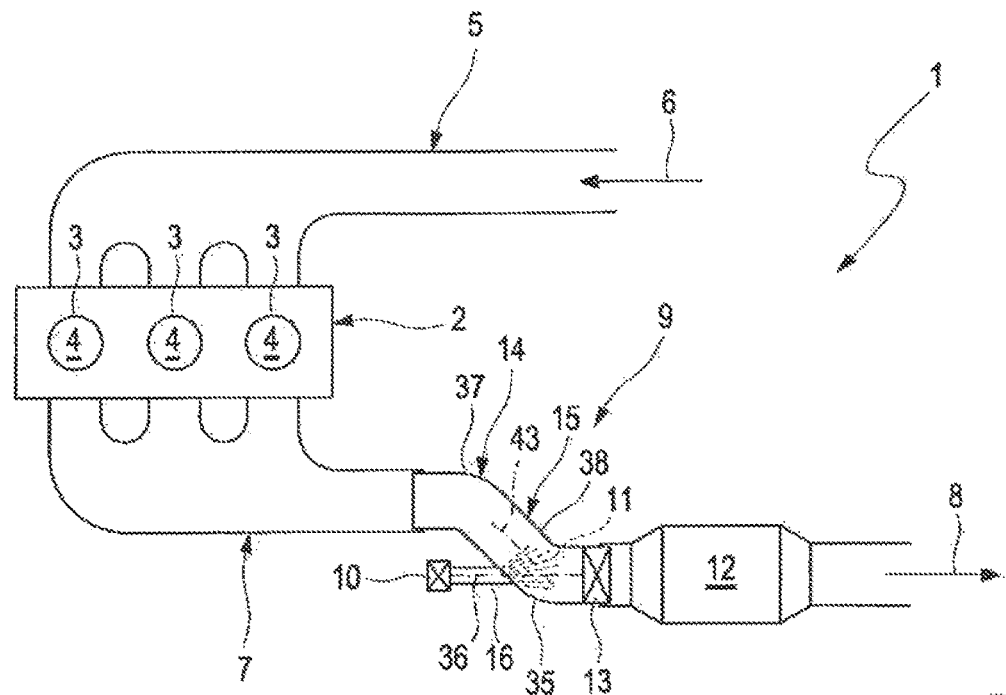
FIG. 1 is a highly simplified, circuit diagram-like schematic view of an internal combustion engine with an exhaust system, which contains an injection device.

Referring to the drawings, according to FIG. 1, an internal combustion engine 1, which may be preferably used in a motor vehicle, comprises an engine block 2, which contains a combustion chamber 4 each in a plurality of cylinders 3. Pistons, not shown here, are mounted in the cylinders 3 with adjustable stroke. A fresh air feed unit 5 is used to feed fresh air to the combustion chambers 4. A corresponding fresh air stream 6 is indicated by an arrow in FIG. 1. An exhaust system 7 is used to remove exhaust gas from the combustion chambers 4. A corresponding exhaust gas stream, is indicated by an arrow in FIG. 1. The exhaust system 7 may be equipped with an SCR system 9, which comprises an injector 10 for introducing a reducing agent 11 into the exhaust gas stream 8 as well as an SCR catalytic converter 12. In addition, a static mixer 13, which is arranged between the injector 10 and the SCR catalytic converter 12 in relation to the direction of flow of the exhaust gas stream 8, may be optionally provided. An injection device 14, which has an exhaust pipe 15 for installing the injection device 14 in the exhaust system 7 as well as a connecting piece 16 for connecting the injector 10, is provided in the SCR system 9 being shown here. In addition, the mixer 13 is a part of the injection device 14 in the example being shown here.

Figure 2:
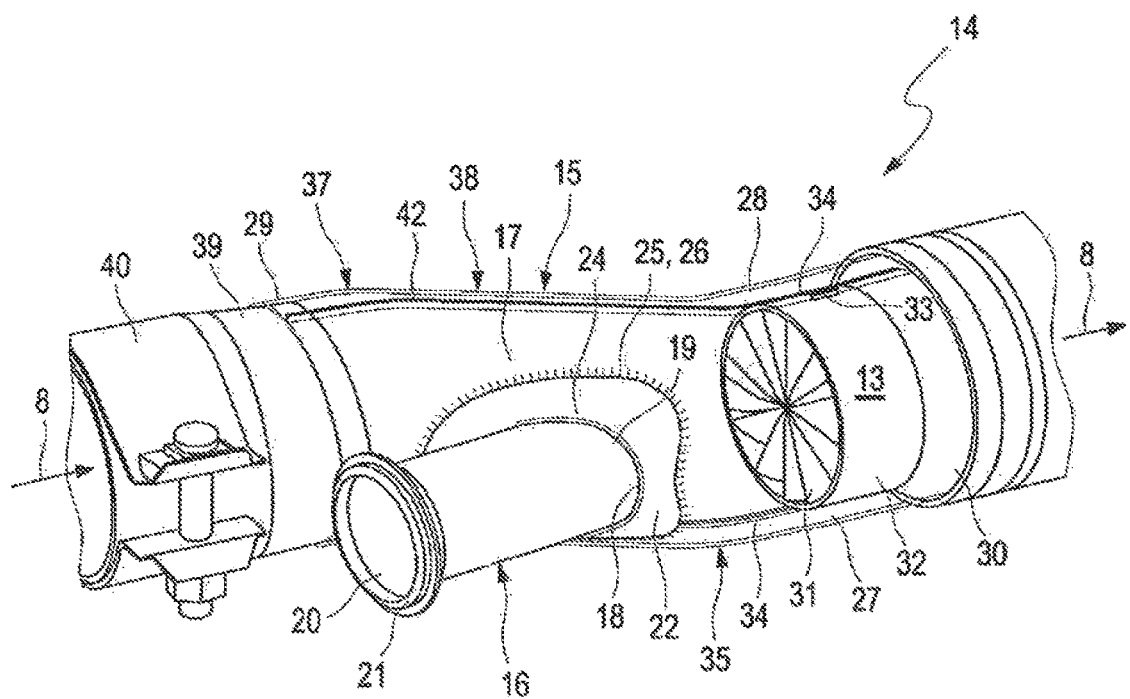
FIG. 2 is an isometric view of the exhaust system in the area of the injection device, wherein an exhaust pipe of the injection device is shown as a transparent pipe.
Figure 3:
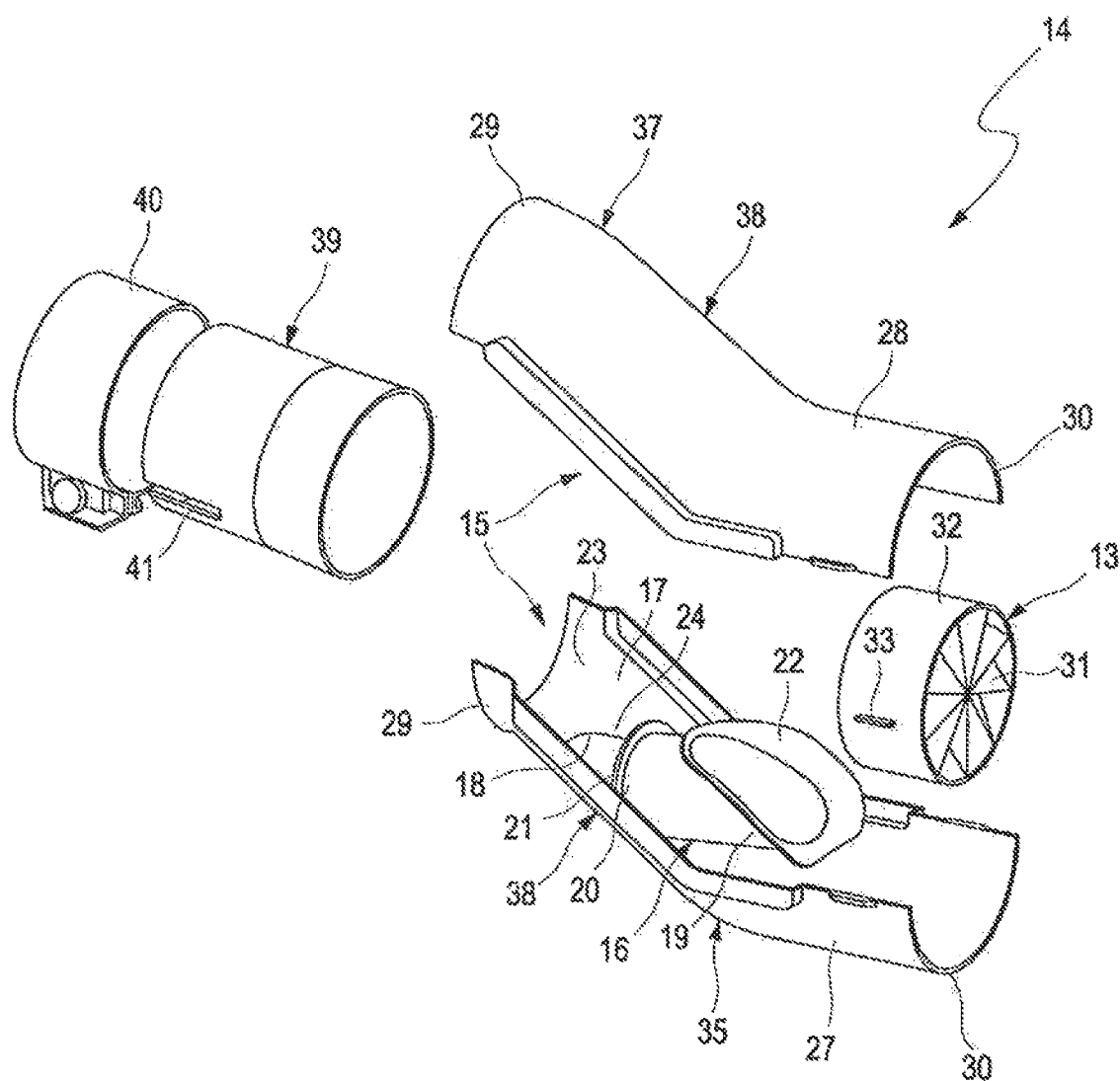
FIG. 3 is an isometric exploded view of the injection device.

According to FIGS. 2 and 3, the injection device 14 comprises the exhaust pipe 15 for guiding the exhaust gas stream 8. A wall 17 of the exhaust pipe 15 has a connecting piece opening 18. The wall 17 radially defines a cross section of the exhaust pipe 15 through which the exhaust gas stream 8 can flow. The connecting piece 16 is inserted with an inner end 19 into the connecting piece opening 18 and is designed at an outer end 20 for connecting the injector 10. A corresponding connection piece 21, which simplifies the connection of the injector 10, is arranged at the outer end 20 in the example shown in FIGS. 2 and 3. The connection piece 21 may be a separate component concerning the connecting piece 16, and it is attached to the connecting piece 16 and is especially welded or soldered to same. A screw connection is conceivable as well.

At its inner end 19, the connecting piece 16 has a collar 22, which laterally projects from the connecting piece 16 and extends fully circumferentially in a circumferential direction of the connecting piece 16. The collar 22 is arranged on an inner side 23 of the wall 17, which inner side is visible in FIG. 3, at an opening edge 24, which encloses the connecting piece opening 18. Furthermore, the collar 22 is welded to the wall 17. A corresponding welded connection 25 is indicated in FIG. 2. The welded connection 25 is preferably designed as a closed, circumferentially extending weld seam 26. The weld seam 26 is located on the inner side 23 of the wall 17.

In the example being shown, the exhaust pipe 15 comprises a first shell 27 and a second shell 28. Both shells 27, 28 extend from an inlet end 29 of the exhaust pipe 15 to an outer end 30 of the exhaust pipe 15. The connecting piece opening 18 is formed on the first shell 27, so that the connecting piece 16 is fastened exclusively to the first shell 27.

The injection device 14 comprises in the example, besides, the static mixer 13, which is inserted for this into the exhaust pipe 15 in the area of the outlet end 30. The mixer 13 is a separate component in relation to the exhaust pipe 15. The mixer 13 has a plurality of guide blades 31 arranged in a turbine-like manner as well as a ring-shaped jacket body 32, which fully encloses the guide blades 31 radially on the outside in the circumferential direction of the pattern. Two diametrically opposite meshing areas 33, which mesh on the respective side in a connection area 34 between the two shells 27, 28, are formed on the jacket 32. Due to the two shells 27, 28 being fixed to one another, the mixer 13 is thus also fixed on the exhaust pipe 15. For example, the two shells 27, 28 are welded to one another in the respective connection area 34. A corresponding weld seam is designated by 42 in FIG. 2. One such weld seam 42 each extends on mutually opposite sides of the exhaust pipe 15 along the respective connection area 34.

The exhaust pipe 15 has a first arc (arcuate portion) 35. The connecting piece opening 18 is arranged axially aligned with the outlet end 30 of the exhaust pipe 15. Further, the connecting piece 16 is designed as a straight pipe and is aligned coaxially with the outlet end 30. An axial direction 36 indicated in FIG. 1 thus extends concentrically through the connecting piece 16 and, in the area of the outlet end 30, through the exhaust pipe 15. The injector 10 can thus likewise introduce the reducing agent 11 into the exhaust gas stream 8 concentrically to this axial direction 36.

The exhaust pipe 15 has here, in addition, a second arc (arcuate portion) 37 as well as a straight pipe section 38 formed between the first arc 35 and the second arc 37. The connecting piece opening 18 is arranged on this straight pipe section 38. The first arc 35 and the second arc 37 are in a common central longitudinal plane of the exhaust pipe 15, which corresponds to the drawing plane in FIG. 1, in the preferred example being shown here. Further, the first arc 35 and the second arc 37 have opposite curvatures. For example, the second arc 37 describes, when viewed in the direction of flow of the exhaust gas stream 8 in FIG. 1, a right curve, while the first arc 35 following it describes a left curve. Further, provisions may be made for the first arc 35 and the second arc 37 to have essentially equal curvatures in terms of value. As a consequence, an inlet-side central longitudinal axis of the exhaust pipe 15, which is present in the inlet end 29, is oriented essentially in parallel to an outlet-side central longitudinal axis of the exhaust pipe 15, which is present in the outlet end 30.

The connecting piece 16 is preferably arranged on the exhaust pipe 15 such that its central longitudinal axis 36, which may hereinafter also be called the central longitudinal axis 36 of the connecting piece, is inclined in relation to a vertical direction, which extends radially to a central longitudinal axis 43 indicated in FIG. 1, which the exhaust pipe 15 has in the area of the connecting piece opening 18 and which may hereinafter also be called the central longitudinal axis 43 of the pipe. This slope between the central longitudinal axis 36 of the connecting piece and the central longitudinal axis 43 of the pipe and the vertical direction thereof equals about 45° in the example being shown.

The curvatures of the two arcs 35, 37 may be equal or essentially equal, i.e., have deviations of up to 20% and preferably up to 10% in their radii of curvature.

As can, further, be determined from FIGS. 2 and 3, the injection device 14 may have, besides, a connection pipe 39, which is permanently connected with the exhaust pipe 15 in a suitable manner and which can be connected to an adjacent component of the exhaust system 7 by means of a clip 40. The connection pipe 29 may be slotted laterally for this purpose at an end facing away from the exhaust pipe 15. A corresponding slot 41 can be recognized in FIG. 3.

The manufacture of the injection device 14 may proceed as follows:

The connecting piece 16 is passed first through the connecting piece opening 18 from the inner side 23 of the wall 17, to the extent that the collar 22 provided at the inner end 19 comes into contact with the opening edge 24 on the inner side 23 of the wall 17. The insertion of the connecting piece 16 into the connecting piece opening 18 is effected in the two-shell design of the exhaust pipe 215 being presented here with the exhaust pipe 15 open, i.e., with the second shell 28 missing. Before placing the second shell 28, the collar 22 is welded to the wall 17. The welded connection 25 is prepared on the inner side 23. The weld seam 26 on the collar 22 is preferably prepared as a collar extending fully circumferentially. After welding the connecting piece 16 to the first shell 27, the mixer 13, which is optionally present, can be inserted into the first shell 27 or into the second shell 28. The second shell 28 is subsequently attached to the first shell 27. The two diametrically opposite connection areas 34, which extend each from the inlet end 29 to the outlet end 30 of the exhaust pipe 15, are preferably welded to one another.

After placing the second shell 28 on the first shell 27 and before or after the welding of the two shells 27, 28 to one another, the connection pipe 39 can be connected to the exhaust pipe 15. For example, the connection pipe 39 can be inserted axially into the inlet end 29 of the exhaust pipe 15 and welded to it.

While specific embodiments of the invention have been shown and described in detail to illustrate the application of the principles of the invention, it will be understood that the invention may be embodied otherwise without departing from such principles.

What is claimed is:

1. An injection device for introducing a reducing agent into an exhaust gas stream of an exhaust system of an internal combustion engine, the injection device comprising:
   an exhaust pipe for guiding the exhaust gas stream, the exhaust pipe having a wall with a connecting piece opening in the wall; and
   a connecting piece, which is inserted with an inner end into the connecting piece opening, the connecting piece being provided at an outer end for connecting an injector, wherein the connecting piece has, at a connecting piece inner end, a laterally projecting, fully circumferentially extending collar, wherein the collar is in contact on an inner side of the wall with an opening edge enclosing the connecting piece opening and the collar is welded to the inner side of the wall.

2. An injection device in accordance with claim 1, wherein the collar is welded to the inner side of the wall with a circumferential weld seam, which circumferential weld seam is closed at the collar and is located on the inner side of the wall.

3. An injection device in accordance with claim 1, further comprising a static mixer inserted into the exhaust pipe in an area of an outlet end of the exhaust pipe.

4. An injection device in accordance with claim 1, wherein the exhaust pipe comprises a first shell and a second shell, which extend each from an inlet end of the exhaust pipe to an outlet end of the exhaust pipe, wherein only the first shell has the connecting piece opening and is welded to the connecting piece.

5. An injection device in accordance with claim 4, further comprising a static mixer inserted into the exhaust pipe in an area of an outlet end of the exhaust pipe, wherein:
the two shells are fastened to one another along two mutually opposite connection areas; and
on an outer side, the mixer has two meshing areas, which mesh each with one of the connection areas, whereby the mixer is fastened to the exhaust pipe due to the two shells being fastened to one another.

6. An injection device in accordance with claim 4, wherein the two shells are fastened to one another along the respective connection area by means of a weld seam, in which the respective meshing area is integrated, such that the respective meshing area is fastened to at least one of the two shells by means of the weld seam.

7. An injection device in accordance with claim 1, wherein the connecting piece is arranged on the exhaust pipe such that a central longitudinal axis of the connecting piece is sloped in relation to a vertical direction extending radially to a central longitudinal axis of the exhaust pipe in the area of the connecting piece opening.

8. An injection device in accordance with claim 1, wherein:
the exhaust pipe has at least one arcuate portion;
the connecting piece opening is arranged axially aligned with an outlet end of the exhaust pipe; and
the connecting piece is straight and is aligned coaxially with the outlet end of the exhaust pipe.

9. An injection device in accordance with claim 1, wherein:
the exhaust pipe has a first arcuate portion;
the connecting piece opening is arranged axially aligned with an outlet end of the exhaust pipe;
the exhaust pipe has a second arcuate portion; and
the connecting piece opening is arranged on a straight pipe section formed between the first arcuate portion and the second arcuate portion.

10. An injection device in accordance with claim 9, wherein at least one of:
the first arcuate portion and the second arcuate portion are located in a common central longitudinal plane of the exhaust pipe;
the first arcuate portion and the second arcuate portion have opposite curvatures; and
the first arcuate portion and the second arcuate portion have equal curvatures in terms of value.

11. An injection device in accordance with claim 1, wherein the collar comprises an outer collar surface extending in a circumferential direction about an outlet of the connecting piece with respect to a longitudinal axis of the connecting piece, the wall of the exhaust pipe comprising an inner exhaust pipe surface and a wall edge surface, the wall edge surface defining the connecting piece opening, the inner exhaust pipe surface defining a fluid flow path for exhaust fluid, the outer collar surface being welded to at least a portion of the inner exhaust pipe surface.

12. A method for manufacturing an injection device for introducing a reducing agent into an exhaust gas stream of an exhaust system of an internal combustion engine, the method comprising the steps of:
providing the injection device with an exhaust pipe for guiding the exhaust gas stream, which exhaust pipe has a connecting piece opening in a wall;
providing the injection device with a connecting piece;
inserting an inner end of the connecting piece into the connecting piece opening to provide an outer end of the connecting piece for a connection to an injector, wherein the step of inserting comprises passing the connecting piece through the connecting piece opening from an inner side of the wall until a laterally projecting, fully circumferentially extending collar, formed at the inner end of the connecting piece, comes into contact with an opening edge enclosing the connecting piece opening on the inner side of the wall; and
welding the collar to the inner side of the wall.

13. A method in accordance with claim 12, wherein the collar is welded to the inner side of the wall by means of a weld seam extending on the collar fully circumferentially.

14. A method in accordance with claim 12, wherein:
the exhaust pipe has a first shell having the connecting piece opening and a second shell;
the connecting piece is inserted into the connecting piece opening before placing the second shell on the first shell, and the connecting piece is welded to the first shell; and
the second shell is attached to the first shell after the connecting piece has been welded to the first shell.

15. A method in accordance with claim 14, further comprising providing a static mixer and inserting the static mixer into the first shell or into the second shell after placing the second shell on the first shell.

16. A method in accordance with claim 12, wherein the collar comprises an outer collar surface extending in a circumferential direction about an outlet of the connecting piece with respect to a longitudinal axis of the connecting piece, the wall of the exhaust pipe comprising an inner exhaust pipe surface and a wall edge surface, the wall edge surface defining the connecting piece opening, the inner exhaust pipe surface defining a fluid flow path for exhaust fluid, the outer collar surface being welded to at least a portion of the inner exhaust pipe surface.

17. An injection device for introducing a reducing agent into an exhaust gas stream of an exhaust system of an internal combustion engine, the injection device being formed by the method steps comprising:
providing the injection device with an exhaust pipe for guiding the exhaust gas stream, which exhaust pipe has a connecting piece opening in a wall;
providing the injection device with a connecting piece;
inserting an inner end of the connecting piece into the connecting piece opening to provide an outer end of the connecting piece for a connection to an injector, wherein the step of inserting comprises passing the connecting piece through the connecting piece opening from an inner side of the wall until a laterally projecting, fully circumferentially extending collar, formed at the inner end of the connecting piece, comes into contact with an opening edge enclosing the connecting piece opening on the inner side of the wall; and
welding the collar to the inner side of the wall.

18. An injection device in accordance with claim 17, wherein the collar is welded to the inner side of the wall by means of a weld seam extending on the collar fully circumferentially.

19. An injection device in accordance with claim 17, wherein:
- the exhaust pipe has a first shell having the connecting piece opening and a second shell;
- the connecting piece is inserted into the connecting piece opening before placing the second shell on the first shell, and the connecting piece is welded to the first shell; and
- the second shell is attached to the first shell after the connecting piece has been welded to the first shell.

20. An injection device in accordance with claim 19, further comprising providing a static mixer and inserting the static mixer into the first shell or into the second shell after placing the second shell on the first shell.

\* \* \* \* \*